Figure 1B:
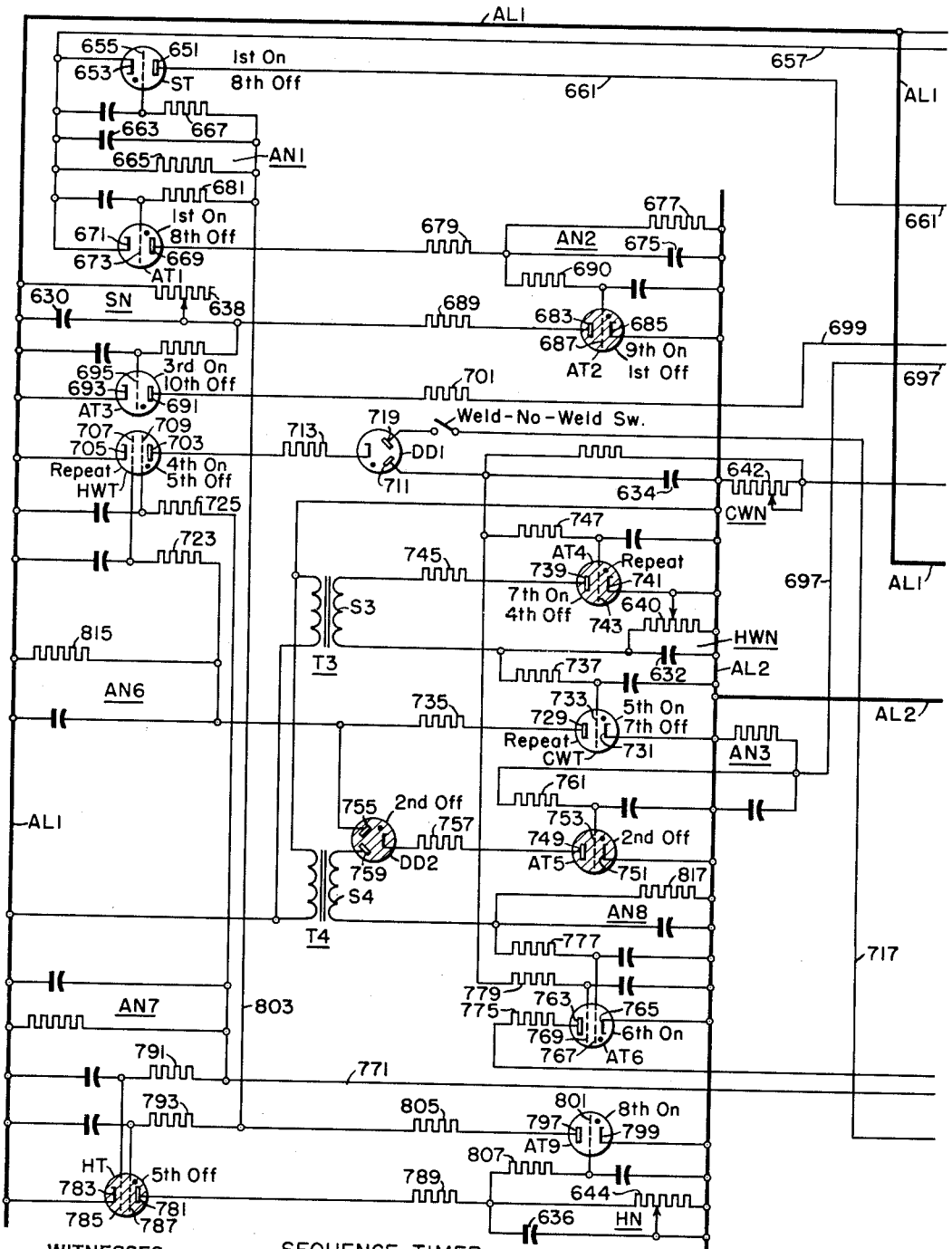

Feb. 14, 1956
C. B. STADUM ET AL
2,735,037
ELECTRIC DISCHARGE APPARATUS
Filed April 23, 1952
7 Sheets-Sheet 1
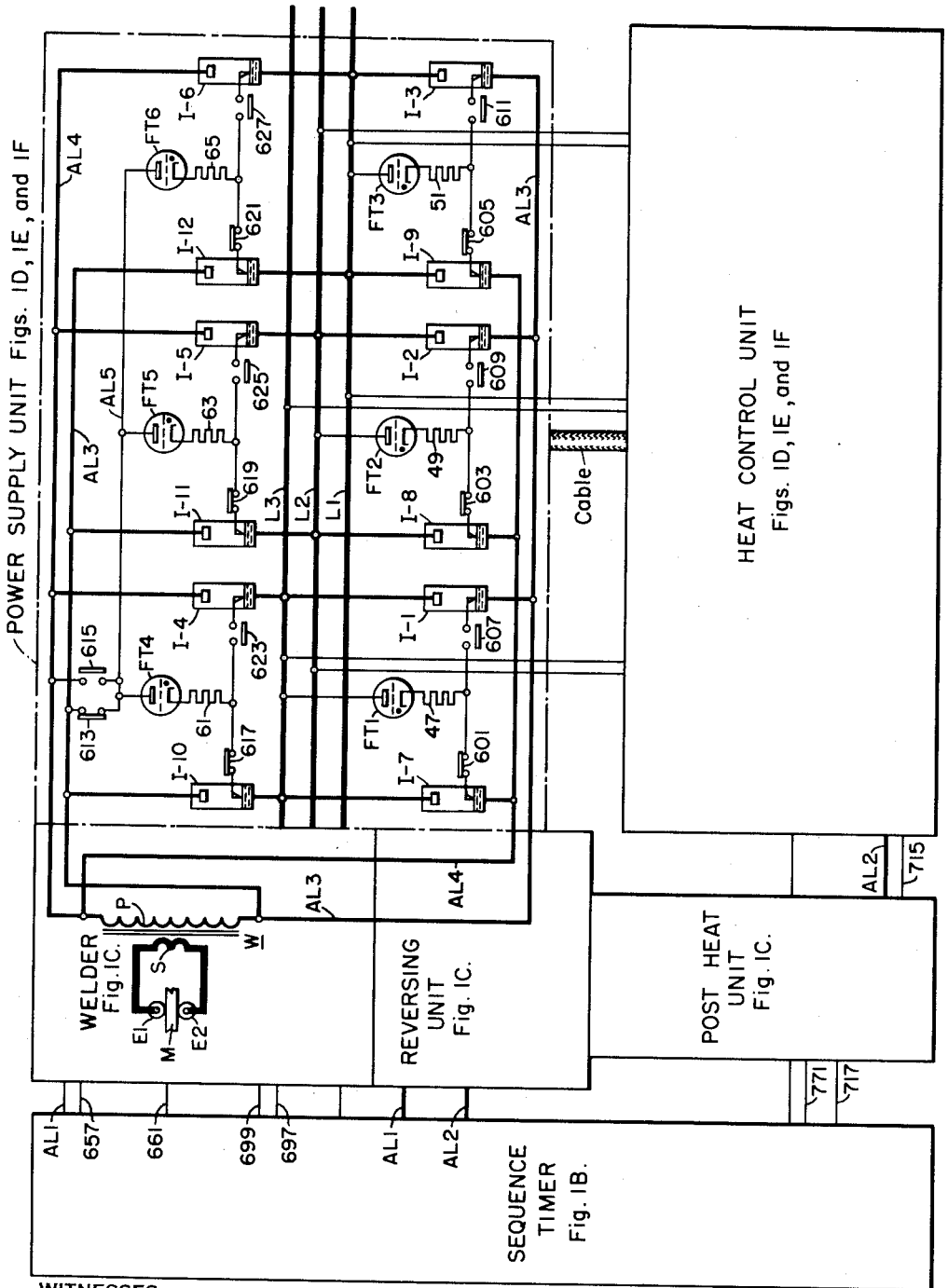
Fig. IA.
WITNESSES:
Robert A Baird
Leon J. Vaza
INVENTORS
Clarence B. Stadum, Edward C. Hartwig
and Hubert W. Van Ness.
BY
Hymen Diamond
ATTORNEY

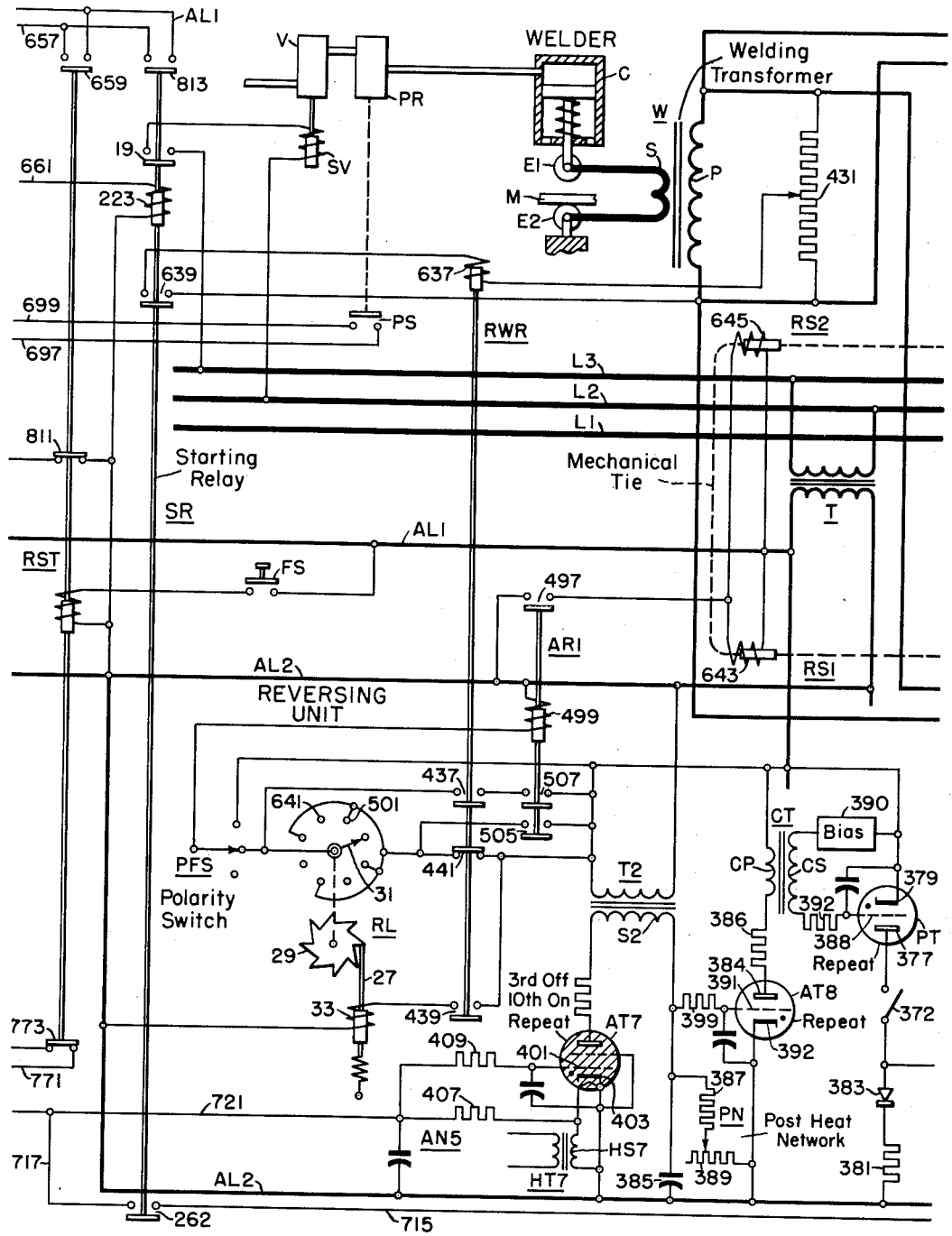
Fig. IC.

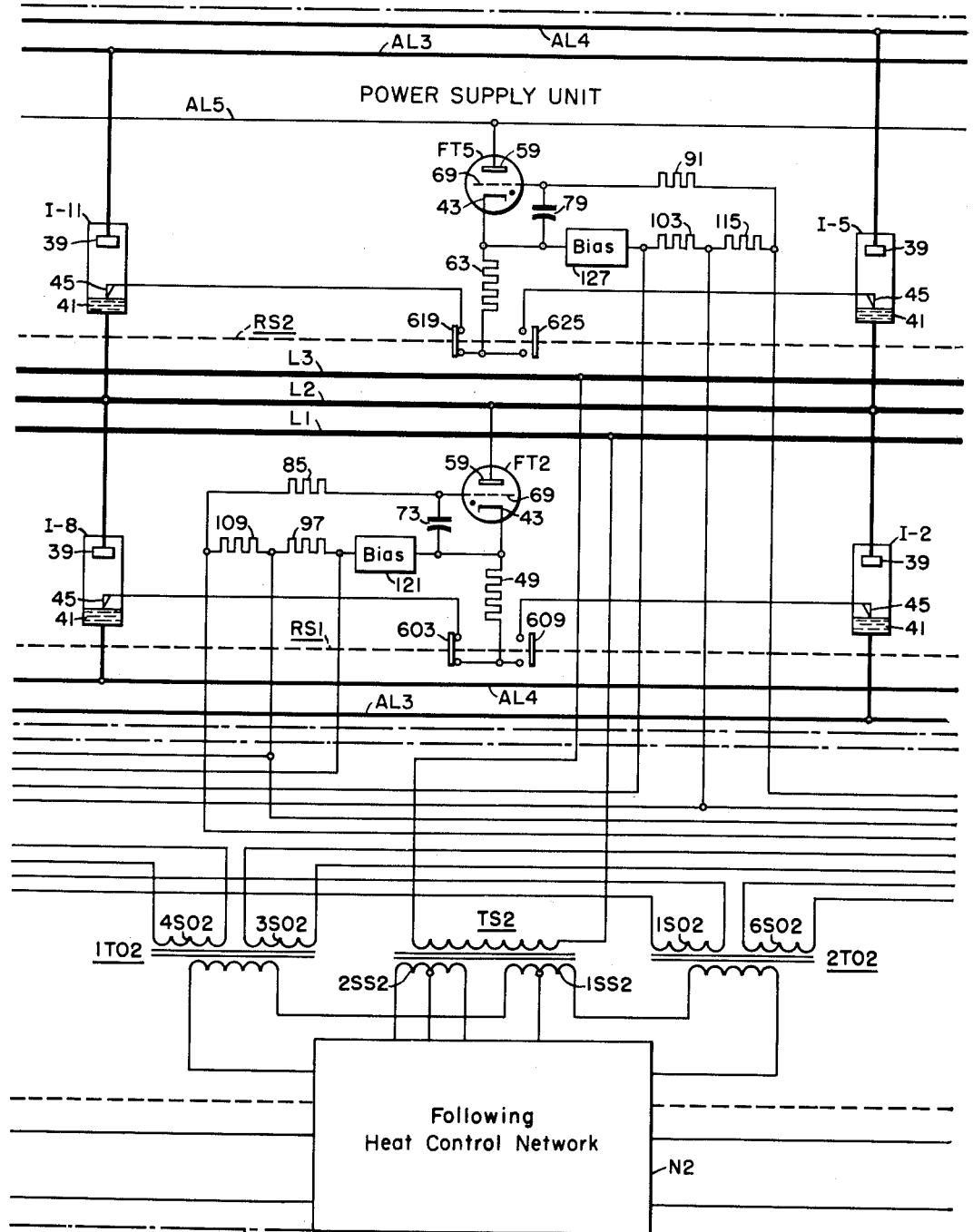
Fig. IE.

INVENTORS
Clarence B. Stadum, Edward C. Hartwig
and Hubert W. Van Ness.

United States Patent Office 2,735,037
Patented Feb. 14, 1956

2,735,037

ELECTRIC DISCHARGE APPARATUS

Clarence B. Stadum, Snyder, Edward C. Hartwig, Lancaster, and Hubert W. Van Ness, Buffalo, N. Y., assignors to Westinghouse Electric Corporation, East Pittsburgh, Pa., a corporation of Pennsylvania Application April 23, 1952, Serial No. 283,892

28 Claims. (Cl. 315—140)

Our invention relates to electric discharge apparatus and has particular relation to apparatus for controlling the supply of current from a polyphase source of alternating current to a load, such as an electric welder.

In our application Serial No. 272,818, filed February 21, 1952, there is disclosed a three-phase, low-frequency welder which includes a plurality of discharge devices, such as ignitrons connected between the phase conductors of a polyphase source and a pair of load conductors. The discharge devices are connected to the load conductors in such manner as to conduct current of only one polarity to the load conductors. The conductors are adapted to be connected to the primary of a welding transformer through switch means which is operable to permit current of one polarity or of the opposite polarity to flow through the primary. With the switch means set in one position, the discharge devices are rendered conductive in a predetermined succession for a predetermined time interval to transmit current of one polarity through the primary. Immediately following this interval when the the current flow through the primary has decreased to zero, the switch means is actuated to set the load conductors to transmit current of the opposite polarity through the primary. Thereafter, the discharge devices are again rendered conductive in a predetermined succession during an interval of the same duration as the first interval, and current of the opposite polarity is conducted through the primary.

The apparatus disclosed in our earlier application has proved highly useful for many purposes. Its principal field of application has been in spot welding, particularly in welding of heavy gauge metals in which individual welds are produced by current pulses of relatively long duration. In apparatus in accordance with our earlier invention serving such purposes, the switch means is an electromagnetic contactor, preferably of the D. C. type, the contacts of which are connected directly between the load conductors and the primary of the welding transformer. We have found in our work with the apparatus disclosed in the earlier application that the complete operation of this contactor consumes approximately 1/12 of a second or five periods of a 60-cycle supply. That is, when the contactor is actuated the time interval between the start of the supply of current to its coil and the complete opening of its previously closed contacts and closing of its previously open contacts is of the order of 1/12 second. There must then be an interval of at least five periods of a 60-cycle supply between the separate welding impulses, and the speed at which welds may be produced is limited by this five period interval. For many purposes, particularly in seam welders and roller-spot welders, a higher speed than that available with our apparatus disclosed in the earlier application is desirable.

It is accordingly an object of our invention to provide apparatus of relatively simple and low cost structure having low installation and maintenance cost for controlling the supply of power from a polyphase source to a welder, which apparatus shall be capable of causing said welder to produce welds at a substantially higher rate than accomplished by prior apparatus.

Another feature of our present invention arises from the discovery that the differences in the magnitudes of the load currents which flow during succeeding low-frequency half-periods in systems of the prior art, such as that disclosed in Patent 2,508,467 to J. R. Parsons and Edward C. Hartwig, arise primarily not from differences in the ignitrons (or other power tubes) but from differences in the firing tubes and their control circuits and components. In the apparatus disclosed in the above mentioned patent, current of one polarity is conducted through one set of ignitrons having separate firing tubes and firing circuits, and current of the opposite polarity is conducted through a second set of ignitrons having separate firing tubes and firing circuits. Each of the units includes a complete set of components. Differences in the two sets of ignitrons, firing tubes and other components cause differences in the magnitude of the current of the opposite polarity transmitted. Corrections can be made for any differences which exist when the apparatus is first set into operation, but said corrections are inadequate for many purposes because the differences manifest themselves and increase progressively as the apparatus ages in use, and the difference in the currents of the opposite polarity correspondingly manifest itself and increases progressively.

One important contributing cause of this difference in currents, we have found to reside in the surge suppressing capacitors and the grid resistors of the firing tubes. These components age severely, and changes in their properties, occurring progressively at an appreciable rate, manifest themselves as appreciable variations in the firing of the ignitrons. We have also realized that the time interval consumed by the contactors of our earlier application in operating from one position to the other arises from their massiveness, and this massiveness is caused by the fact that the contacts must conduct the current transmitted by the main discharge devices. If the transition from load current of one polarity to load current of the opposite polarity could be accomplished by interruption of substantially lower currents than the load currents, the speed of operation of our apparatus could be substantially increased.

Another object of our invention is to provide electric discharge apparatus for controlling the supply of power from a polyphase source to a welder which shall supply welding currents of opposite polarity that are of substantially equal magnitude in spite of variations in the components of said apparatus and which shall at the same time be capable of speed of operation such that said welder may produce welds at a high rate.

A further object of our invention is to provide electric discharge apparatus for controlling the supply of power to a seam welder or a roller-spot welder which welder operates to produce welds at a relatively high rate, which apparatus shall be capable of supplying to the welder currents of opposite polarity but of substantially equal magnitude, independently of variations in its components.

An incidental object of our invention is to provide a novel firing circuit for ignitrons.

Another incidental object of our invention is to provide a novel ignitron converter.

Still another incidental object of our invention is to provide a novel relay circuit for controlling the firing of a plurality of ignitrons.

In accordance with our present invention, we provide control apparatus having two sets of ignitrons connected to conduct currents of opposite polarity through the primary of the welding transformer. These ignitrons are controlled from only one set of firing tubes and firing circuits. Each firing tube and circuit is selectively connected either to an ignitron of one set or to an ignitron of the other, and when in one position or the other, is capable of rendering the set of ignitrons, in question, conductive to conduct current of one polarity or the opposite polarity. The transfer of the firing tubes and circuits from one set of ignitrons to the other is effected by relatively light switch means, the time of operation of which is of the order of 1/60 of a second, or one period of a 60-cycle source. Thus, the rate at which welds may be produced with apparatus embodying this invention is substantially higher than the rate with the apparatus disclosed in our earlier application.

The apparatus in accordance with the specific aspects of our invention includes a plurality of supply buses adapted to be energized from a polyphase source and a pair of load buses or conductors which are adapted to be connected to the terminals of the primary of a welding transformer. A pair of ignitrons are connected in antiparallel between each supply bus and each of the load buses; that is, there are four times as many ignitrons as there are supply buses, and for a three-phase supply, there are 12 ignitrons. Only one firing circuit is associated with each pair of ignitrons, and this firing circuit is connected to the ignitrons through selective switching means so that in accordance with the setting of the switching means each firing circuit may fire either one of the ignitrons or the other. In one setting of the selective switching means, those ignitrons are fired which conduct current of one polarity to the load conductors, and in the other setting of the switching means, the ignitrons which conduct current of the opposite polarity are fired. In the operation of our apparatus, each firing circuit is connected to fire the former ignitrons during one low-frequency (load) half-period and to fire the latter ignitrons during the succeeding low-frequency half-period.

Figure 1D:
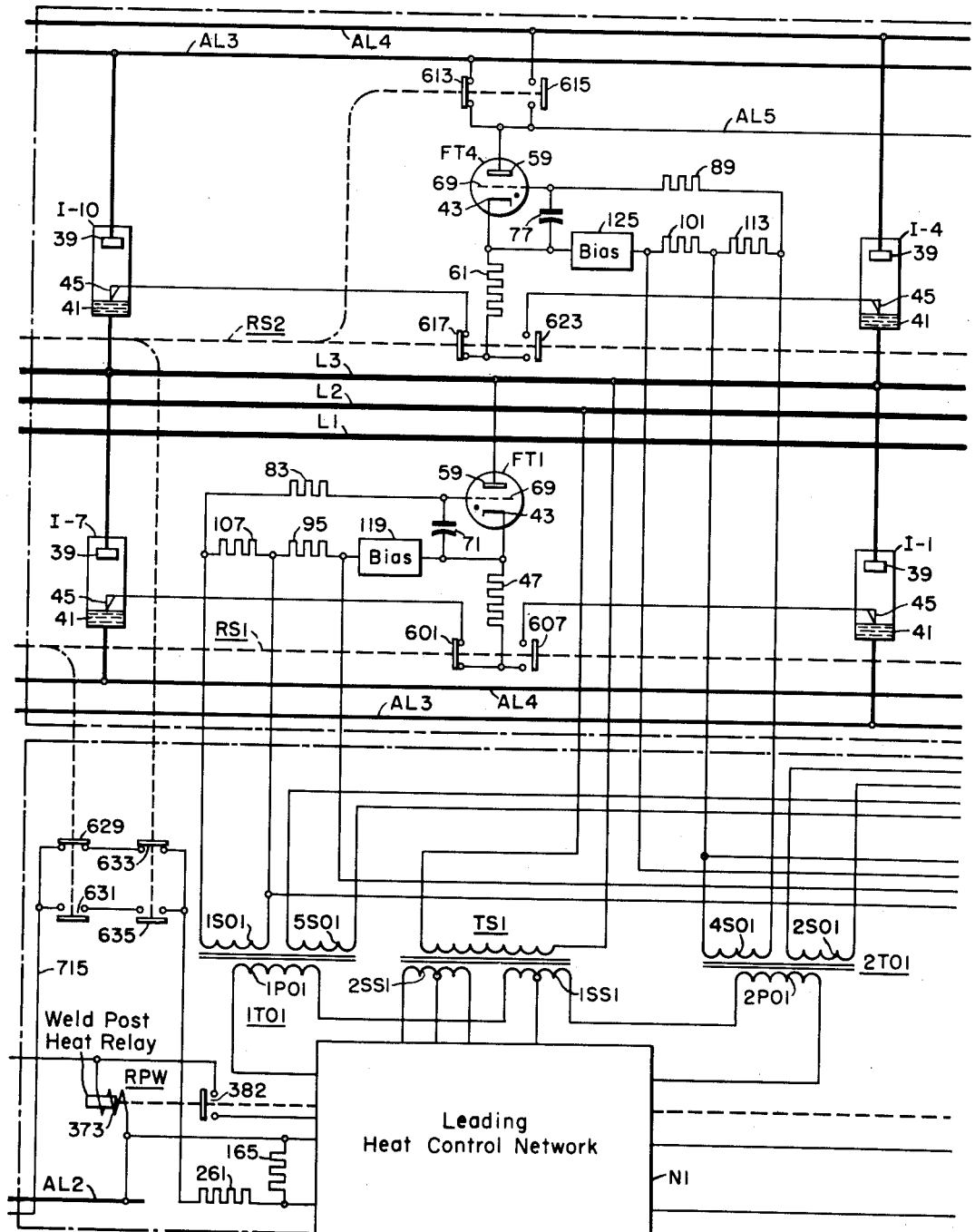
Figure 1F:
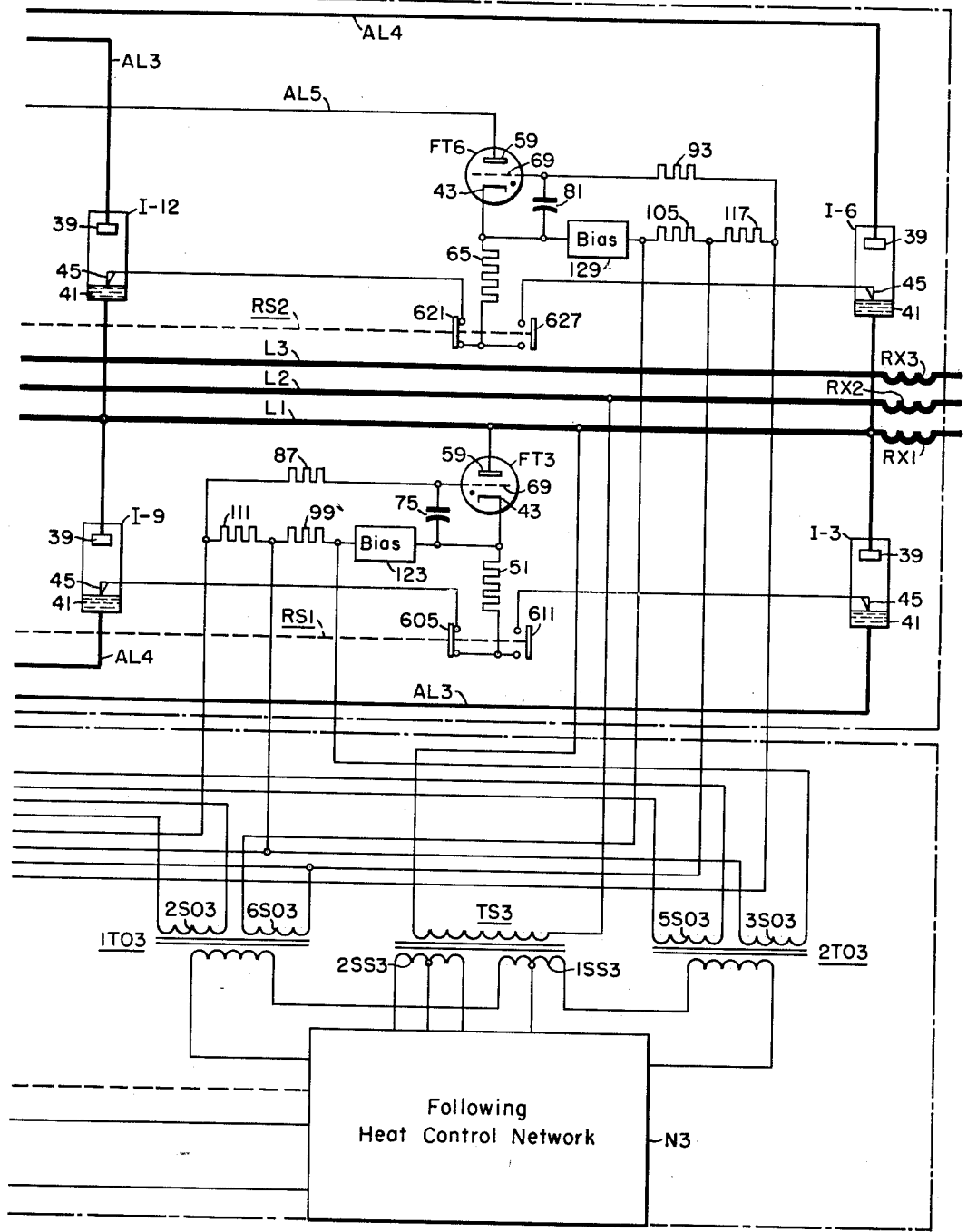
Figure 2:
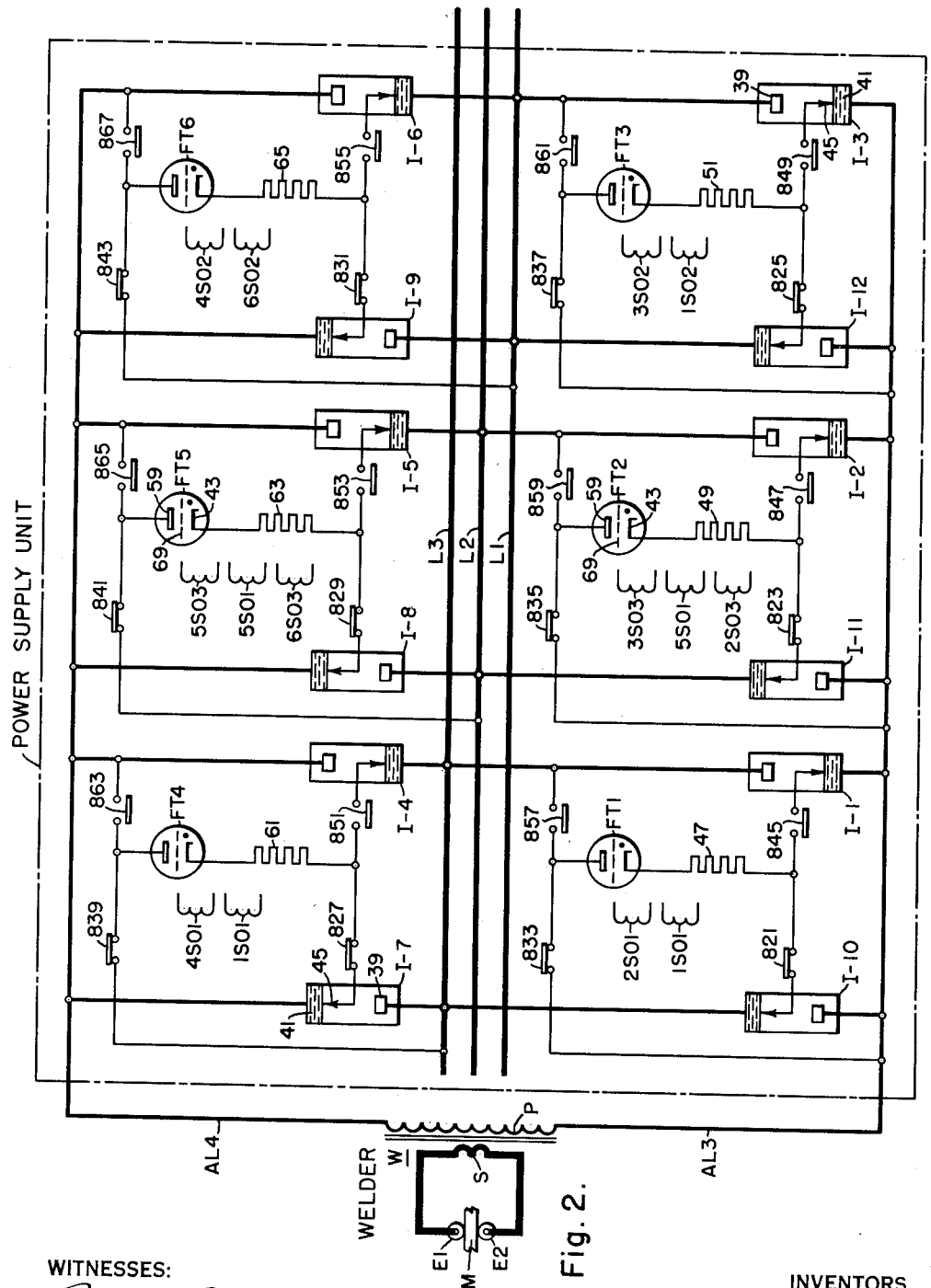

The ignitrons, the firing circuits and the switching means may be interconnected in several ways, two of which are disclosed, one in Figure 1 and the other in Fig. 2.

In the interconnection arrangement of Fig. 2, each firing circuit is associated with one pair of the antiparallel connected ignitrons. In such an arrangement, the switching means must operate selectively to connect each firing circuit either to the anode and the igniter of one of the antiparallel connected ignitrons or to the anode and the igniter of the other antiparallel connected ignitron. Where the supply is of the three-phase type and the switching means is of the electromagnetic type, 24 switching contacts are required for this interconnection arrangement. While this arrangement functions satisfactorily, in our preferred arrangement, shown by Fig. 1, the number of switching contacts is reduced to 14.

This is accomplished by associating each firing circuit, not with a pair of antiparallel connected ignitrons, but with a pair of ignitrons having their anodes or cathodes connected to the same supply bus, and their cathodes or anodes connected to different load conductors. The anodes of two each of the ignitrons are connected to a supply bus. The firing circuit for both ignitrons may derive its power from this same bus, and in transferring the firing circuit from one of the ignitrons to the other, only the connection to the igniter need be transferred. For these ignitrons then, only two contacts per pair are required; that is, for the 6 ignitrons of a three-phase system, only 6 contacts would be required. The cathodes of two each of the other ignitrons are connected to a supply bus, and the anodes of one of these ignitrons is connected to one of the load conductors while the anode of the other is connected to the other load conductors. The firing circuits for each pair of these ignitrons may be connected to an auxiliary conductor which may, during the transfer from one set of ignitrons to the other, be transferred from one of the load conductors to the other. Each firing circuit may be connected to the igniters of the ignitrons in the same manner as the firing circuits of the ignitrons having their anodes connected to the supply buses. Each pair of ignitrons having their cathodes connected to the buses thus require two contacts for connection to the igniter, and all of the pairs of ignitrons require an additional two contacts for connection either to one of the load buses or the other. For a three-phase system, the last-mentioned 6 ignitrons would then require 8 contacts. Thus, for this preferred apparatus, only 14 rather than 24 contacts are required.

Our preferred interconnection arrangement also has the advantage that the firing circuits are each associated with two ignitrons which are fired in the same order during the half-periods of opposite polarity. The firing circuits are, in the other interconnection system disclosed, associated with ignitrons which are fired in a different order. Since ignitrons fired in a different order in the succession conduct currents of different polarity, our preferred arrangement is less susceptible to differences in the currents conducted during successive low frequency half-periods than the other arrangement disclosed.

The features of our invention that we consider novel are discussed generally above. The invention both as to its organization and its method of operation, together with additional objects and advantages thereof, will best be understood from the following description of specific embodiments when read in connection with the accompanying drawings, in which:

Figure 1A is a block diagram showing a preferred embodiment of our invention;

Figs. 1B, 1C, 1D, 1E and 1F together are a circuit diagram of this embodiment of our invention; and Fig. 2 is a diagram showing a modification of our invention.

*Description of Figs. 1A to 1F*

The apparatus shown in Figs. 1A to 1F is a seam welder including a Welder, a Reversing Unit, a Power Supply Unit, a Post Heat Unit, a Heat Control Unit, and a Sequence Timer. The relationship between these units is shown in Fig. 1A. Power is supplied to the units from the buses L1, L2, L3 of a three-phase commercial supply to which reactances RX1, RX2, RX3 (see Fig. 1F) are connected to absorb the effect of short circuits or commutation fluctuations in the apparatus. As is the case with the earlier filed application, these reactances may be lumped, or they may be the available regulation of the supply. The power for welding is derived directly from the buses L1, L2 and L3, and the power for certain of the other units is derived from auxiliary buses AL1 and AL2, which are energized from the buses L2 and L3 through a transformer T.

The Welder, the Post Heat Unit and the Heat Control Unit are similar to the corresponding units of the apparatus disclosed in our earlier application Serial No. 272,818 the disclosure of which is for this purpose and others made a part of this application. The important features of our invention are embodied in the Power Supply Unit and in the Reversing Unit. The Sequence Timer could be similar to that disclosed in our earlier application and would be similar for a high speed spot welder. Since Figs. 1A to 1F disclose a seam welder, a Sequence Timer suitable for seam welding is included in the system disclosed.

To the extent practicable, the components of Figs. 1A to 1F are labelled the same as corresponding components of Figs. 1A to 1F of our earlier applications so that the relationship between the apparatus disclosed in the latter and in this application may be understood.

The Power Supply Unit includes the ignitrons I–1, I–2, I–3, I–4, I–5, I–6, I–7, I–8, I–9, I–10, I–11, and I–12. These ignitrons are connected in pairs in antiparallel between the buses L1, L2, L3 and the load conductors AL3 and AL4 so that current of one polarity may be conducted through one set of ignitrons I-1 to I-6 and current of the opposite polarity through the other set I-7 to I-12. Ignitrons I-1 and I-10 are connected in antiparallel between bus L3 and load conductor AL3; ignitrons I-2 and I-11 are connected in antiparallel between bus L2 and load conductor AL3; and ignitrons I-3 and I-12 are connected in antiparallel between bus L1 and load conductor AL3. Ignitrons I-4 and I-7, I-5 and I-8, I-6 and I-9, respectively, are correspondingly connected between buses L3, L2 and L1, and load conductor AL4.

Each of the ignitrons has an anode 39, a cathode 41 and an igniter 45. The anodes 39 of ignitrons I-1—I-7, I-2—I-8, and I-3—I-9 are connected respectively to the buses L3, L2 and L1. The cathodes 41 of ignitrons I-1, I-2 and I-3 are connetced to auxiliary bus AL3, and the cathodes 41 of the other ignitrons I-7, I-8 and I-9 are connected to auxiliary bus AL4. The cathodes 41 of ignitrons I-4—I-10, I-5—I-11, I-6—I-12, are connected respectively to buses L3, L2, L1; the anodes 39 of ignitrons I-4, I-5, I-6, are connected to load conductor AL4, and the anodes of the other ignitrons I-10, I-11 and I-12, are connected to load conductor AL3.

A firing circuit is associated respectively with each of the pairs of ignitrons I-1, I-7; I-2, I-8; I-3, I-9; I-4, I-10; I-5, I-11; I-6, I-12. Each firing circuit includes a firing thyratron FT1, FT2, FT3, FT4, FT5, and FT6, respectively. Each firing thyratron has an anode 59, a cathode 43 and a control electrode 69.

The anodes 59 of the firing thyratrons FT1, FT2 and FT3 associated with the ignitrons I-1, I-7; I-2, I-8 and I-3, I-9, having their anodes 39 connected to the buses L3, L2 and L1, are connected to the corresponding buses L3, L2 and L1. The cathodes 43 of these thyratrons FT1, FT2 and FT3 may be connected through a current limiting resistor 47, 49, 51 and through contacts 601, 603, 605 or 607, 609, 611 of selector relay RS1 either to the igniters 45 of the associated ignitrons I-7, I-8, I-9, or to the igniters 45 of the associated ignitrons I-1, I-2, I-3, respectively. The contacts 601, 603, 605 associated with ignitrons I-7, I-8 and I-9 are normally closed, the contacts 607, 609, 611 associated with ignitrons I-1, I-2 and I-3 being normally open. Thus, depending on the position of the relay, the firing thyratrons FT1, FT2 and FT3 are connected to fire either ignitrons I-7, I-8 and I-9, respectively, or ignitrons I-1, I-2 and I-3, respectively.

The anodes 59 of firing thyratrons FT4, FT5 and FT6 are connected to a common conductor AL5. This conductor may be connected through contacts 613 and 615 respectively of another selector relay, RS2, either to load conductor AL4 to which the anodes 39 of ignitrons I-4, I-5 and I-6 are connected, or to load conductor AL3 to which the anodes 39 of ignitrons I-10, I-11 and I-12 are connected. The cathode 43 of the thyratrons FT4, FT5 and FT6 may be connected through a current limiting resistor 61, 63, 65 and through the contacts 617, 619, 621 or 623, 625, 627 respectively of the relay RS2, either to the igniters 45 of ignitrons I-10, I-11 and I-12, or to the igniters 45 of the ignitrons I-4, I-5 and I-6. The contact 613 connected to the load conductor AL3 and the contacts 617, 619 and 621 connected to the igniters of ignitrons I-10, I-11 and I-12 are normally closed, while the contacts 615, 623, 625, 627 connected to load conductor AL4 and to the igniters of ignitrons I-4, I-5 and I-6 are normally open. Thus, depending on the position of the relay, either ignitrons I-10, I-11 and I-12 may be rendered conductive, or ignitrons I-4, I-5 and I-6 may be rendered conductive.

In the deenergized position of the selector relays RS1 and RS2, then, the ignitrons I-7 to I-12 may be rendered conductive to conduct current from bus AL4 to bus AL3. In the energized position of the relays, the ignitrons I-1 to I-6 may be rendered conductive to conduct current from bus AL3 to bus AL4.

The selector relays RS1 and RS2 which control the connection of the firing thyratrons FT1 to FT6, either to the ignitrons I-7 to I-12, or to the ignitrons I-1 to I-6, are linked by a rigid mechanical tie so that they operate together. These relays also include an electrical interlock for preventing operation unless they are properly set. This interlock comprises an additional normally-open and a normally-closed contact 629 and 631 and 633 and 635 respectively on each relay. The normally-closed contacts 629 and 633 are connected in series with the input resistors 165 and 261 of the Heat Control Unit, and the normally open contacts 631 and 635 are similarly connected in series. Thus, current is not transmitted to operate the heat Control Unit unless either both normally-closed contacts 629 and 633 are closed, or both normally-open contacts are closed, that is, unless either both relays are completely deenergized or both relays are completely energized.

One selector relay with 14 contacts may be provided instead of the two relays RS1 and RS2. The two relays are provided for convenience. It is also within the scope of our invention to provide a number of selector relays all tied together electrically and mechanically.

The control circuits of the firing thyratrons FT1 to FT6 are similar to the corresponding circuits of our earlier apparatus. Each control circuit includes a pair of resistors 95, 97, 99, 101, 103, 105 and 107, 109, 111, 113, 115 and 117, a bias 119, 121, 123, 125, 127, 129, in addition to a surge suppressing capacitor and a grid resistor, which need not be discussed in detail. The firing thyratrons are controlled from a Heat Control Unit in the same manner as the firing thyratrons of the apparatus disclosed in our earlier application.

The Reversing Unit controls the selector relays RS1 and RS2. This unit includes a weld-responsive relay RWR, the exciting coil 637 of which is connected through a contact 639 of starting relay SR across a portion of a voltage divider 431 which derives its potential from the primary P of the welding transformer W. The relay RWR has two normally open contacts 437 and 439, and a normally closed contact 441.

The reversing unit also includes an auxiliary relay AR1 and a ratchet relay RL. The auxiliary relay AR1 has three normally open contacts 497, 505, and 507. The ratchet relay has a movable contact 31 which moves alternately to engage fixed contacts 501 connected to the normally closed contact 441 of relay RWR and unconnected contacts 641.

The exciting coil 499 of auxiliary relay AR1 may be connected between auxiliary buses AL1 and AL2 through several circuits, the principal one including normally closed contact 441 of the relay RWR, the contacts 31 and 501 of the ratchet relay RL, and a polarity switch PFS. The exciting coil 33 of the ratchet relay is adapted to be connected between buses AL1 and AL2 through the normally open contact 439 of relay RWR.

The auxiliary relay AR1 controls the selector relays RS1 and RS2. The exciting coils 643 and 645 of these relays are connected in parallel between buses AL1 and AL2 through the normally open contact 497 of the auxiliary relay. The other contacts 505 and 507 of the auxiliary relay are in circuit with the coil of the auxiliary relay 499 and control its operation, assuring that it is actuated to actuate the selector relays RS1 and RS2 only when the current flow through the primary P of the welding transformer W is zero.

The Sequence Timer includes a squeeze thyratron ST, a heat thyratron HWT, a cool thyratron CWT and a hold thyratron HT. The operation of these thyratrons are timed by a plurality of networks including a squeeze network SN associated with the squeeze timer, a heat network HWN associated with the cool thyratron CWT, a cool network CWN associated with the heat thyratron HWT, and a hold network HN associated with the hold thyratron HT. The networks SN, HWN, CWN and HN each includes a capacitor 630, 632, 634 and 636, shunted by a variable resistor 638, 640, 642 and 644 respectively.

The sequential operation is attained by the firing in sequence of the thyratrons ST, HWT, CWT and HT. This sequential firing is effected through a plurality of auxiliary thyratrons AT1, AT2, AT3, AT4, AT5, AT6 and AT9.

The squeeze thyratron ST has an anode 651, a cathode 653 and a grid 655. The anode and cathode of this thyratron are connected in a circuit extending from auxiliary bus AL1 through a normally open contact 659 of a relay RST, which may be called the sequence timer relay, a conductor 657, the cathode and anode 653 and 651 of the thyratron ST, a conductor 661, the exciting coil 223 of the squeeze relay SR to bus AL2. Between the grid 655 and the cathode 653 of the thyratron ST, an auxiliary network AN1 consisting of a capacitor 663 and a resistor 665 in shunt is connected through a grid resistor 667. The first auxiliary thyratron AT1 also has an anode 669, a cathode 671 and a grid 673. Its anode and cathode are connected in a circuit extending from bus AL2 through a network AN2 consisting of a capacitor 675 and a resistor 677 in shunt, a current limiting resistor 679, the anode and cathode of the thyratron AT1, the conductor 661, the normally open contact 659 of the relay RST to the bus AL1. Between the grid 673 and the cathode 671 of this thyratron AT1, the same network AN1, as is connected between the grid 655 and the cathode 653 of the thyratron ST, is connected through a grid resistor 681.

The auxiliary thyratron AT2 has an anode 683, a cathode 685 and a grid 687. Its anode-cathode circuit extends from bus AL1 through squeeze network SN, a current limiting resistor 689, the anode and cathode of the thyratron, to the bus AL2. The network AN2 is connected between the grid 687 and the cathode 685 of this thyratron AT2 through a grid resistor 690. The third auxiliary thyratron AT3 has an anode 691, a cathode 693, and a grid 695, and its anode and cathode are connected in a circuit extending from the bus AL2 through a capacitor-resistor network AN3, a conductor 697, the pressure responsive switch PS of the welder, a conductor 699, a current limiting resistor 701, the anode and cathode of the thyratron to the bus AL1. The squeeze network SN is connected between the grid 695 and the cathode 693 of this thyratron through a grid resistor.

The heat thyratron HWT includes an anode 703, a cathode 705, a control grid 707 and a suppressor grid 709. The anode and cathode of this thyratron are connected in one branch circuit extending from the bus AL2 through the cool network CWN, one section 711 of a double diode DD1, a current limiting resistor 713, the anode and cathode of the thyratron to the bus AL1. The anode and cathode of the thyratron HWT are also connected in a second branch circuit from the bus AL2 through the resistor 165 of the Heat Control Unit, the resistor 261 of the Heat Control Unit, either normally closed or normally open contacts 629, 633 or 631, 635 of the selective relays RS1 and RS2, a conductor 715, the normally open contact 262 of the squeeze relay SR, a conductor 717, the weld-no-weld switch, the other section 719, of the double diode DD1, the current limiting resistor 713, the anode and cathode of the thyratron HWT to the bus AL1. This latter branch circuit has another branch which extends from the bus AL2 through the resistor-capacitor network AN5 of the auxiliary thyratron AT7 of the Post Heat Unit, a conductor 721 connected to the conductor 717 which in turn is connected to the weld-no-weld switch. Between the control grid 707 and the cathode 705 of the heat thyratron HWT, a capacitor-resistor network AN6 is connected through a grid resistor 723. Between the suppressor grid 709 and the cathode 705, a second capacitor-resistor network AN7 is connected through a grid resistor 725.

The cool thyratron CWT has an anode 729, a cathode 731 and a grid 733. The anode and cathode of this thyratron CWT are connected in a circuit extending from the bus AL1 through the network AN6 connected between the control grid 707 and the cathode 705 of the heat thyratron HWT, a current limiting resistor 735, the anode and cathode of the thyratron CWT to the auxiliary bus AL2. The heat network HWN is connected between the grid 733 and the cathode 731 of the thyratron CWT through a grid resistor 737.

The auxiliary thyratron AT4 has an anode 739, a cathode 741 and a grid 743. This thyratron AT4 is supplied from a separate transformer T3, and the anode and cathode of the thyratron AT4 are connected across the secondary S3 of the transformer T3 through a current limiting resistor 745 and the heat network HWN. The cool network CWN is connected between the grid 743 and the cathode 741 of the auxiliary thyratron AT4 through a grid resistor 747.

The auxiliary thyratron AT5 has an anode 749, a cathode 751 and a grid 753. The anode and cathode of this thyratron are connected in two branch circuits, one supplied directly from the buses AL1 and AL2 and the other from a separate transformer T4. The first circuit extends from the bus AL1 through the network AN6 connected to the grid 707 of the heat thyratron HWT, a section 755 of a double diode DD2, a current-limiting resistor 757, and the anode and cathode of the thyratron AT5 to the bus AL2. The anode and cathode of the thyratron AT5 are connected in the other branch through the resistor 757, the other section 759 of the double diode DD2, and a capacitor-resistor network AN8 across the secondary S4 of the transformer T4. The capacitor resistor network AN3 connected in the anode circuit of the auxiliary thyratron AT3 is connected through a grid resistor 761 between the grid 753 and the cathode 751 of the auxiliary thyratron AT5.

The auxiliary thyratron AT6 has an anode 763, a cathode 765, a control grid 767 and a suppressor grid 769. The anode and cathode of this thyratron are connected in a circuit extending from the bus AL1 through the network AN7 connected between the suppressor grid 709, and the cathode 705 of the thyratron HWT, a conductor 771, a normally closed contact 773 of the sequence timer relay RST, a current limiting resistor 775, the anode and cathode of the thyratron AT6 to the bus AL2. The network AN8 in the anode circuit of the auxiliary thyratron AT5 is connected through a grid resistor 777, between the control grid 767 and the cathode 765 of the auxiliary thyratron AT6. The cool network CWN is connected through a grid resistor 779 between the suppressor grid 769 and the cathode 765 of the auxiliary thyartron AT6.

The hold thyratron HT has an anode 781, a cathode 783, a control grid 785 and a suppressor grid 787. The anode and cathode of this thyratron are connected in a circuit extending from bus AL2 through the hold network HN, a current limiting resistor 789, the anode and cathode of the thyratron to the bus AL1. Between the control grid 785 and the cathode 783 of this thyratron, the network AN7 is connected through a grid resistor 791. The network AN1 connected between the grid 655 and the cathode 653 of the squeeze thyratron ST is also connected between the suppressor grid 787 and the cathode 783 of the hold thyratron HT through a grid resistor 793.

The remaining auxiliary thyratron AT9 has an anode 797, a cathode 799, and a grid 801. Its anode and cathode are connected in a circuit extending from the bus AL1 through the normally open contact 657 of the sequence timer relay RST, the conductor 657, the capacitor resistor network AN1 connected between the grid 655 and the cathode 653 of the squeeze thyratron ST, a conductor 803, current limiting resistor 805, the anode and cathode of the thyratron AT9 to the bus AL2. The hold network HN is connected between the grid 801 and the cathode 799 of the thyratron AT9 through a grid resistor 807.

Stand-by condition of Figs. 1A to 1F

The stand-by condition of the apparatus shown in Figs. 1A to 1F is the condition of the apparatus when it is ready for use to seam weld material. In this condition, the power switch is closed, and the cathodes of the various thyratrons are adequately heated. In describing this condition, it will be assumed that the ratchet relay, which has the function of memory, is in the position shown in the drawing, in which position it was left after the last weld produced.

In the stand-by condition, the starting switch FS of the apparatus is open. The sequence timer relay RST is then deenergized, and the anode circuits of the squeeze thyratron ST, the auxiliary thyratron AT1 and the auxiliary thyratron AT9 are open. These thyratrons are then non-conductive. Since auxiliary thyratron AT1 is non-conductive, the capacitor-resistor network AN2 in its anode circuit is discharged, and the potential between the grid and the cathode of the auxiliary thyratron AT2 is zero so that this thyratron is conductive. Since thyratron AT2 is conductive, the squeeze network SN is charged, maintaining the grid of the auxiliary thyratron AT3 negative relative to its cathode. The auxiliary thyratron AT3 is then non-conductive. The anode circuit of this thyratron AT3 is moreover open at the pressure switch PS. Since the thyratron AT3 is non-conductive, the network connected in its anode circuit is discharged, and the thyratron AT5 is conductive.

Since thyratron AT5 is conductive, the capacitor-resistor network AN6 connected between the grid 707 and the cathode 705 of the heat thyratron HWT is charged, and this thyratron is non-conductive. Since thyratron HWT is non-conductive, current does not flow through the resistor 165 and 261 of the Heat Control Unit, and the latter does not deliver pulses to fire the ignitrons. In addition, the network connected in the control grid circuit of the auxiliary thyratron AT7 of the Post Heat Unit is also discharged, and this thyratron is conductive so that thyratron AT8 is non-conductive and thyratron PT is also non-conductive, as is explained in our earlier application. Further, the cool network CWN is discharged, and the auxiliary thyratron AT4 is conductive so that the heat network HWN is charged and the cool thyratron CWT is non-conductive.

Since the thyratron AT5 is conductive, the capacitor-resistor network AN8 in its anode circuit is charged, and the thyratron AT6 is non-conductive. The capacitor resistor network in the anode circuit of the thyratron AT6 is then discharged, and the hold thyratron HT is conductive so that the hold network HN is charged. The auxiliary thyratron AT9 is then non-conductive and the network AN1 is discharged.

The understanding of the apparatus will be facilitated by now considering the stand-by condition of the welder and the Reversing Unit.

Since there is no current in the welding transformer, the relay RWR is deenergized, and its contacts are in the position shown in the drawing. Relay AR1 is also deenergized, and the selective relays are deenergized. The ratchet relay is in a position in which the movable contact 31 engages an unconnected contact 641.

The power unit may now be considered. Since the selective relays are deenergized, the firing thyratrons FT1 to FT6 are connected to fire the ignitrons I-7 to I-12, but the Heat Control Unit is quiescent and the firing pulses are not delivered through its output transformers 1TO1, 2TO1, 1TO2, 2TO2, 1TO3 and 2TO3.

Operation of Figs. 1A to 1F

To perform a welding operation, the material M to be welded is inserted between the electrodes E1 and E2, and the starting switch FS is closed. The sequence timer relay RST whose coil is connected between the buses AL1 and AL2 through the starting switch FS, is then energized, closing its normally open contact 659 and opening its normally closed contacts 773 and 811.

At the now closed contact 659 of the sequence timer relay RST, the anode circuits through the squeeze thyratron, the auxiliary thyratron AT1 and the auxiliary thyratron AT9, are now closed. Since the network AN1 is discharged, the squeeze thyratron and the auxiliary thyratron AT1 are immediately rendered conductive. The auxiliary thyratron AT9 does not become conductive because the hold network HN is charged.

Because the squeeze thyratron ST is conductive, the relay SR is energized, closing its contacts 813, 19, 639, and 262. At the first contact 813, the contact 659 of the sequence timer relay RST is shunted so that the squeeze thyratron ST and the auxiliary thyratron AT1 are locked in. At the next contact 19, the solenoid SV for the pressure valve V of the welder is energized, and pressure is supplied to cause the movable electrode E1 to engage the work M. When the pressure is ultimately built up to the proper magnitude, the pressure switch PS is closed. The electrodes E1 and E2 are of the roller type and, if it is to be seam welded, the material is moved between electrodes as it is welded at a speed such that the welds overlap. Once the pressure is applied to the work M by the electrodes E1 and E2, the movement of the work is started.

At another now closed contact 639 of the squeeze relay SR, the circuit through the coil 637 of the weld responsive relay RWR is closed, but this relay remains deenergized because no current, as yet, flows through the primary P. At the last contact 262 of the squeeze relay SR, the conductor 717 from the heat thyratron HWT is connected to the input to the Heat Control Unit, but since the thyratron HWT is still quiescent, the Heat Control Unit also remains quiescent.

Because the thyratron AT1 is conductive, the network in its anode circuit is charged. Immediately on the conduction of the thyratron AT1, the thyratron AT2 is rendered non-conductive. The supply of current to charge the squeeze network SN is then interrupted, and this network discharges during the squeeze interval which may be predetermined, as desired. At the end of the squeeze interval, the thyratron AT3 is rendered conductive. The current flow through this thyratron now charges the network in its anode circuit. The thyraton AT5 is rendered non-conductive interrupting the charging of the network AN6 connected between the grid 707 and the cathode 705 of the heat thyratron HWT and of network AN8 connected between the control grid 767 and the cathode 765 of the auxiliary thyratron AT6. The resistors 815 and 817 respectively in these networks AN6 and AN8 are such as to permit the associated thyratrons to conduct immediately. However, only the heat thyratron HWT conducts; the anode circuit of the thyratron AT6 is open at the now opened contact 773 of the sequence timer relay RST.

The heat thyratron HWT now conducts, current flowing through its three branches. Through the one of these branches in series with the input resistors 261 and 165 of the Heat Control Unit, current flows through these resistors, and the operation of the Heat Control Unit is started. Through the second branch, the network in the grid circuit of the thyratron AT7 is charged immediately rendering this thyratron non-conductive. The post heat network PN now begins to discharge preparing the Post Heat Unit for operation at the proper time. Through the other branch, the cool network CWN is charged. By the charging of the cool network, the thyratron AT4 is rendered non-conductive permitting the heat network HWN to discharge. So long as the heat network HWN is discharging, the heat thyratron HWT remains conductive, and the Heat Control Unit remains in operation.

We may now consider the operation of the Power Supply Unit. The leading heat-control network N1 of this Unit is first energized and when it is energized, it supplies a pulse through the transformer 1TO1. The heat thyratron HWT, which receives its power from the auxiliary buses AL1 and AL2, that is, in effect from the buses L3 and L2, is so related to the leading heat-control network of the Heat Control Unit that the pulses supplied by the transformer 1TO1 are impressed when bus L3 is most positive relative to bus L2. Pulses are then simultaneously impressed on the firing tube FT1 by the secondary 1SO1 and on the firing tube FT5 by the secondary 5SO1 at instants predetermined by the settings of the heat-control components (not shown). Ignitrons I–7 and I–11 are rendered conductive conducting current from the bus L3 through the ignitron I–7, conductor AL4, the primary P, conductor AL3, ignitron I–11 to bus L2.

Approximately ⅙ of a period of the supply later, a pulse is supplied to transformer 2TO2 of following network N2. The resulting pulse from the secondary 6SO2 of this transformer now renders firing thyratron FT6 conductive, firing ignitron I–12. At this time, the potential of bus L1 is becoming more negative than that of bus L2, and ignitron I–11 is becoming non-conductive. Eventually, the latter is extinguished, and the conduction continues through ignitron I–7 downward through the primary P and through ignitron I–12.

One-sixth of a period of the supply later, a pulse is delivered by the following heat control network N3 through the secondary 2SO3 to fire thyratron FT2. Ignitron I–8 is now fired. At this time, bus L2 is becoming more positive than bus L3. In a short time, the potential of bus L2 increases sufficiently so that ignitron I–7 is rendered non-conductive. Conduction now continues downward through the primary P and through ignitrons I–8 and I–12.

As is explained in our earlier application, the leading heat control network N1 is now again energized ⅙ of a period later in spite of the fact that the anode-cathode potential of the heat thyratron HWT has become negative and it has become non-conductive. This time a pulse is supplied through the primary 2PO1 of transformer 2TO1. Through the secondary 4SO1 of this transformer, a pulse is impressed to render thyratron FT4 conductive. Ignitron I–10 is then fired. The firing of thyratron FT4 and ignitron I–10 occurs at an instant when bus L3 has become more negative with respect to bus L2. Ignitron I–12 is now rendered non-conductive, and current flows from bus L2 through ignitron I–8 downward through the primary P through ignitron I–10 to bus L3.

One-sixth of a period later heat-control network N2 operates, and a pulse is supplied through secondary 3SO2 of transformer 1TO2 to render conductive thyratron FT3. Ignitron I–9 is now fired. This firing occurs at the instant when bus L1 has become most positive. Ignitron I–8 is then rendered non-conductive, and current flows from bus L1 through ignitron I–9 downward through the primary P through ignitron I–10 to bus L3.

One-sixth of a period later, the following network N3 operates, and a pulse is supplied through secondary 5SO3 of transformer 2TO3 to render conductive thyratron FT5. Ignitron I–11 is now fired at an instant when bus L2 has become most negative. Current now flows from bus L1 through ignitron I–9 downward through the primary P through ignitron I–11 to bus L2.

At this time, the heat thyratron HWT is non-conductive, and the leading heat control network is in a condition such that it does not continue to operate. However, if the heat network is still charged so as to maintain the cool thyratron CWT non-conductive, heat thyratron HWT now again conducts, and the above-described sequence of conduction of ignitrons I–7 to I–10 is repeated. This sequence may be repeated a number of times depending on the setting of the heat network HWN, and the current through the primary P and the welding current built up to a desired magnitude.

While the heat network HWN is still effective to maintain the cool thyratron CWT non-conductive, the post-heat network PN becomes discharged sufficiently to permit thyratron AT8 to conduct. The post heat thyratron PT now conducts energizing the post heat relay RPW and setting the phases of the heat control networks N1, N2 and N3 for post heat operation. Beginning with ignitron I–7, ignitrons I–7 to I–10 are now fired later in the periods of the supply than heretofore. The current in the primary P and the welding current now decay as predetermined by the setting of the post-heat components (not shown). During all this time the current is of one polarity flowing downward through the primary, and the weld is annealed.

Eventually, the heat network HWN discharges sufficiently to permit the cool thyratron CWT to become conductive. The network AN6 in the anode circuit of the latter is now charged immediately biasing the heat thyratron HWT to non-conductivity. Since the cool thyratron CWT and the heat thyratron HWT are oppositely connected to the buses AL1 and AL2, the cool thyratron CWT conducts during the half-periods when the heat thyratron is non-conductive. The network AN6 in the control grid circuit of the heat thyratron HWT is thus charged following a half-period during which the heat thyratron has conducted. During the half-period following the charge of the network AN6, the control grid 707 having been biased while the heat thyratron HWT was non-conductive, the latter does not again conduct.

Since the heat thryratron HWT is non-conductive, the cool network CWN begins to discharge. In addition, because the heat thyratron HWT is non-conductive, current no longer flows through the resistors 165 and 261 in the input circuit to the leading heat-control network N1. The operation of the Heat Control Unit then stops at the end of the last full sequence of operations. The last two ignitrons to conduct I–9 and I–11 now continue to conduct until the current through the primary P decays to zero. No current now flows through the ignitrons and through the primary P for a time interval determined by the setting of the cool network CWN. Since the heat thyratron HWT is non-conductive, the Post Heat Unit is reset. One weld has now been completed and the welded metal cools and solidifies as the work M advances between the electrodes E1 and E2.

Now consider the Reversing Unit. While current was flowing through the primary P of the welding transformer, the weld responsive relay RWR was energized and picked up. Current then flowed through the coil 33 of the ratchet relay, and the contact 31 of this relay was advanced one notch to engage one of the contacts 501. No further change occurred in the Reversing Unit so long as current flowed in the primary P.

When current stops flowing, through primary P, the weld-responsive relay RWR is deenergized and drops out. A circuit is now completed through the contact 441, the contacts 501 and 31 of the ratchet relay RL, and the coil 499 of the auxiliary relay AR1. The auxiliary relay is energized and is locked in the energized condition through its contact 505. Since the contact 497 of the auxiliary relay AR1 is now closed, the selective relays RS1 and RS2 are both energized, opening their normally closed contacts and closing their normally open contacts. If these relays are completely energized, the auxiliary conductor AL5 is now connected to the auxiliary conductor AL4, the firing thyratrons FT1 to FT7 are now connected to the igniters 45 of the ignitrons I–1 to I–6, and the normally open contacts 631 and 635 are connected in the circuit between the conductor 715 and the input resistors 165 and 261 to the leading heat-control network N1. The ratchet relay RL operates while the welding current is being conducted. The auxiliary relay AR1 and the selective relays RS1 and RS2 which operate during the cool interval are relatively light, they act quickly to perform the transfer operation, and the transfer operation is completed in a time interval of the order of ⅟₆₀ of a second.

The cool network CWN continues to discharge, and at the end of the cool interval, it is discharged sufficiently to permit the thyratron AT4 to conduct. The heat network HWN is now charged, and the cool thyratron CWT is rendered non-conductive. The transformer which supplies anode potential to the thyratron AT4 is so poled that the anode of the thyratron AT4 is positive when the anode of the cool thyratron CWT is positive. The heat network is then charged while the cool thyratron CWT is conductive and becomes effective a full period after the beginning of the last conductive half-period of the thyratrons AT4 and CWT. The network AN6 in the anode circuit of the cool thyratron CWT discharges quickly while the cool thyratron CWT is non-conductive, and the heat thyratron HWT is again rendered conductive.

The Heat Control Unit is now again operated, and the Post Heat Unit is now again set for operation. At an instant predetermined by the weld setting of the leading heat-control network N1, pulses are supplied through the secondaries 1SO1 and 5SO1 to fire thyratrons FT1 and FT5. As has been explained, these pulses are supplied while the potential of bus L3 is most positive, and the potential of bus L2 is most negative. Ignitrons I-1 and I-5 are now fired conducting current from the bus L3, through ignitron I-1 upward through the primary P, through ignitron I-5 to bus L2.

One-sixth of a period of the supply later when bus L1 has become more negative than bus L2, a pulse is supplied from the network N2 through the secondary 6SO2 to fire thyratron FT6. Ignitron I-6 is now fired. Immediately thereafter, ignitron I-5 is rendered non-conductive, and current flow continues upward through the primary P from the bus L3 through ignitron I-1, primary P, ignitron I-6 to bus L1.

One-sixth of a period later, a pulse is supplied through secondary 2SO3, ignitron I-2 is fired, and thereafter ignitron I-1 stops conducting. Current now flows from bus L2, through ignitron I-2 upwardly through primary P, through ignitron I-6 to bus L1.

The effect of the current delivered during its positive half-period by the heat thyratron HWT is maintained during the negative half period when thyratron HWT is non-conductive so that the leading heat control network N1 now again operates, this time supplying a pulse through the secondary 4SO1 to fire thyratron FT4 and ignitron I-4. Ignitron I-6 stops conducting, and current now flows from the bus L2, through ignitron I-2 upward through primary P, through ignitron I-4 to bus L3. One-sixth of a period later, a pulse is supplied through secondary 3SO2, firing thyratron FT3 and ignitron I-3. Current is then conducted from the bus L1 through ignitron I-3 through primary P, ignitron I-4 to bus L3. Finally, a pulse is transmitted ⅙ of a period later through secondary 5SO3, firing thyratron FT5 and ignitron I-5. Current now flows from bus L1 through ignitron I-3, primary P, ignitron I-5 to bus L2.

A cycle of conduction upward through the primary P has now been completed. If the heat network HWN is set for additional conduction, a second pulse is now transmitted by the heat thyratron HWT to actuate the Heat Control Unit. The above-described cycle involving the conduction of the ignitrons I-1 to I-6, is then again repeated. This process continues and the current in the transformer W builds up until the post heat relay RWP operates, after which the ignitrons are fired later in the half-periods than heretofore, the current decays at a preset rate, and the weld is annealed.

Eventually, the heat network HWN discharges sufficiently to render the cool thyratron CWT conductive. The heat thyratron HWT is then rendered non-conductive. The current to the Heat Control Unit is then interrupted, and the current flowing through the primary P drops to zero as the current through the last ignitrons I-3 and I-5 to conduct decays. The ignitrons now remain quiescent for a time interval determined by the setting of the cool network. During all this time, the current is one polarity flowing upward through the primary P.

While current was conducted upward through the primary P, the weld responsive relay RWR was actuated, and the ratchet relay RL was again actuated. By the actuation of the relay RWR, the contact 441 was opened, but the auxiliary relay AR1 remained locked in through its contact 505. The selective relays RS1 and RS2 then remained energized, and the operation of the ignitrons I-1 to I-6 continued undisturbed. By this actuation of the ratchet relay, the movable contact 31 was connected to one of the unconnected fixed contacts 641. However, the auxiliary relay AR1 remained locked in through its contact 507 and through the now closed contact 437 of the relay RWR.

When current flow through the primary P stops, the relay RWR is deenergized and drops out. Relay AR1 is now deenergized. Since the upper contact 497 of this relay is now opened, the selective relays RS1 and RS2 become deenergized and also drop out. The normally closed contacts of the selective relays are now closed, and normally open contacts are opened. Auxiliary bus AL3 is then connected to auxiliary bus AL5, the firing thyratrons FT1 to FT6 are connected to ignitrons I-7 to I-12, and the normally closed contacts 629 and 633 of the selective relays RS1 and RS2 respectively connect the heat thyratron HWT to the input resistors 165 and 261 and leading heat control network N1. The system is now reset for another operation during which current will flow downward through the primary P. Again, because the relays AR1, and the selective relays RS1 and RS2 are light, the resetting operation is completed in a short time interval.

The operation described above may be continued as long as desirable. So long as it continues, the selective relay is alternately energized and deenergized as described, and current flows alternately downward and upward through the primary P of the welding transformer for the desired time intervals. The operating properties of the ignitrons I-1 to I-12 are substantially alike so that current conducted by the ignitrons I-1 to I-6 is substantially equal to the current conducted by the ignitrons I-7 to I-12. The ignitrons I-1 to I-12 do not change their properties materially as they age, and unexpected differences in the current flow through succeeding low frequency half-periods do not occur.

The firing thyratrons and their components, and the components of the Heat Control Unit and the Sequence Timer, which do have a tendency to change, control the operation of both successive low frequency half-periods, and whatever changes occur affect both of the half-periods alike so that the current flow during these half-periods remains the same independently of any changes.

The ratchet relay RL operates while the current is conducted through primary P, and its time of operation does not affect the rate at which welds may be produced with the apparatus. The auxiliary relay AR1 and the selective relays which operate during the quiescent interval, are relatively light and complete their operation in a very short time interval so that welds may be produced at a high rate.

When it is desired to stop the welding operation, the switch FS is released and relay RST is deenergized and drops out opening contact 659 and closing its contacts 773 and 811. The opening of contact 659 has no effect because relay SR remains energized and now open contact 659 is shunted. The anode circuit of the thyratron AT6 is closed at the contact 773 and it is ready to conduct if its grid potentials permit conduction.

At contact 811 the cool network CWN, which is connected to the suppressor grid 769 of thyratron AT6, is short-circuited. If the switch FS is opened during a cool time when heat thyratron HWT is non-conductive, the potential applied by the cool network CWN to this suppressor grid 769 thus immediately becomes zero. If the switch is opened during the time when the heat thyratron HWT is conductive, biasing potential continues to be supplied to this suppressor grid. At the same time the thyratron AT5 is non-conductive because the network AN3 is charged by the thyratron AT3. If then the switch is opened during a cool interval, thyratron AT6 is rendered conductive immediately. If it is opened during a heat time, thyratron AT6 is rendered conductive immediately at the end of the last heat time.

When thyratron AT6 conducts, it charges network AN7 and impresses blocking potential on control grid 785 of the hold thyratron HWT and also on the suppressor grid 709 of the heat thyratron HWT. The heat thyratron is now prevented from starting another heat interval. At the same time the charging of the hold network HN is stopped and the hold network discharges. This discharge continues for a time interval determined by the setting of the network and thereafter the thyratron AT9 is rendered conductive charging the network AN1. The squeeze thyratron ST and the thyratron AT1 are now rendered non-conductive. Relay SR drops out permitting the welder and the remainder of the system to reset for another operation and thyratron AT2 immediately becomes conductive. The squeeze network SN is now recharged for another operation and the thyratron AT3 is rendered non-conductive and maintained non-conductive by the now open pressure switch PS. The network AN3 then immediately discharges permitting the thyratron AT5 to conduct and reset the network AN6 to maintain the heat thyratron HWT non-conductive. The network AN8 is also charged rendering the thyratron AT6 non-conductive. The network AN7 now discharges permitting the hold thyratron HT to conduct thus recharging the hold network HN and rendering the thyratron AT9 non-conductive.

The apparatus is now reset for another operation.

*Description of Fig. 2*

In Fig. 2, the important features of a modification of our invention is shown. Since these features involve only the Power Supply Unit, only this unit is presented.

Like the apparatus shown in Figs. 1A to 1F, the apparatus shown in Fig. 2 includes a plurality of sets of ignitrons I-1 to I-12. Pairs I-1, I-10; I-2, I-11; I-3, I-12; I-4, I-7; I-5, I-8; I-6, I-9, are connected in antiparallel between the supply buses L3, L2, L1 and load bus AL3 and supply buses L3, L2, L1 and load bus AL4 respectively. As in the apparatus shown in Figs. 1A to 1F only one firing thyratron FT1 to FT6 is associated with each pair of ignitrons and is selectively connected to operate with one or the other of the pair. But the ignitrons are paired differently in the apparatus shown in Fig. 2 than in the apparatus shown in Figs. 1A to 1F. The thyratrons F1 to F6 are in the Fig. 2 apparatus each associated with a pair of antiparallel connected ignitrons I-1, I-10; I-2, I-11; I-3, I-12; I-4, I-7; I-5, I-8; I-6, I-9; and are selectively connected to one each of these ignitrons I-1 to I-6 or to the other I-10, I-11, I-12, I-7, I-8, I-9. The apparatus shown in Fig. 2 requires 24 switching contacts, as compared to the 14 contacts required by the apparatus shown in Figs. 1A to 1F. However, the former alternative arrangement may be found useful in certain situations for example where it is desirable to build up a system such as is disclosed herein from a plurality of cross-connected ignitron units.

The apparatus shown in Fig. 2 includes a plurality of normally closed contacts 821, 823, 825, 827, 829, 831, 833, 835, 837, 839, 841 and 843 and a plurality of normally open contacts 845, 847, 849, 851, 853, 855, 857, 859, 861, 863, 865, 867 which may be the contacts of one or several selective relays. The coils and the armatures of these relays are not shown. If a plurality of such selective relays are provided, they should be mechanically and electrically linked as are the selective relays of the system shown in Figs. 1A to 1F. For convenience each of the relays should carry a set of the normally open contacts and a set of normally closed contacts associated with the same thyratrons FT1 to FT6.

Normally closed contacts 839, 841, 843, 833, 835, 837 of the selective relays are interposed respectively between the anodes 59 and the anodes 39 of the thyratrons FT1 to FT6, and the ignitrons I-7 to I-12. The other normally closed contacts 827, 829, 831, 821, 823, 825 are interposed respectively between the cathode resistors 61, 63, 65, 47, 49 and 51 of the firing thyratrons FT1 to FT6, and the igniters 45 of the ignitrons I-7 to I-12. The normally open contacts 857, 859, 861, 863, 865, 867 and 845, 847, 849, 851, 853, 855, of the selective relays are correspondingly interposed between the anodes 59 of the firing thyratrons FT1 to FT6 and the anodes 39 of ignitrons I-1 to I-6, and between the resistors 47, 49, 51, 61, 63 and 65, and the igniters 45 of the ignitrons I-1 to I-6. The selective relays are controlled from a system similar to that disclosed in Fig. 1C operating during the cool intervals to close the normally open contacts or to permit the normally closed contacts to close.

The firing thyratrons are controlled from a Heat Control Unit similar to that shown in Figs. 1A to 1F.

*Operation Fig. 2*

During operation when the Heat Control Unit operates firing thyratrons FT4 and FT2 are first energized by pulses from secondaries 1SO1 and 5SO1. Ignitrons I-7 and I-11 are energized and current flows from bus L3 through ignitron I-7, downward through primary P, ignitron I-11 to bus L2. Then in succession ignitrons I-12, I-8, I-10, I-9 and I-11 are energized as pulses are supplied in succession through secondaries 1SO2, 6SO2, 2SO1, 4SO2 and 3SO3. As in the case of Figs. 1A to 1F, this cycle may be repeated as desired and the current the transformer W built up and thereafter may be permitted to decay in accordance with a desired pattern. The current then remains at zero for a short time interval.

While current is flowing through the primary P, the Reversing Unit is set for second operation and when the current falls to zero it operates, closing the normally open contacts 851 to 867 and opening the normally closed contacts 821 to 843. Now the Heat Control Unit again operates. Thyratrons FT1 and FT5 are now fired by pulses through secondaries 1SO1 and 5SO1, and ignitrons I-1 and I-5 are fired conducting current upward through primary P. Thereafter ignitrons I-6, I-2, I-4, I-3 and I-5 are fired in succession by successive pulses from the secondaries 6SO2, 2SO3, 4SO1, 1SO2, 5SO3. This cycle may now be repeated as desired and after the current in primary P is built up it may be permitted to decay as desired.

During this time, the Reversing Unit again operates resetting the selector relays. Current may then again be transmitted downward through the primary P and ignitrons I-7 to I-12. But the secondaries of the output transformers 1TO1, 2TO1, 1TO2, 2TO2, 1TO3, 2TO3 are connected differently to the thyratrons FT1 to FT6 of the Fig. 2 apparatus than to the firing thyratrons of the apparatus shown in Figs. 1A to 1F. The relationship is shown in Fig. 2. Secondaries 1SO1 and 5SO1 (1TO1) supply potential to fire thratrons FT1 and FT5 and FT4 and FT2; secondaries 2SO1 and 4SO1 (2TO1) supply potential to fire thratrons FT1 and FT4 respectively, secondaries 3SO2 and 4SO2 (1TO2) supply potential to fire thyratrons FT3 and FT6 respectively; secondaries 1SO2 and 6SO2 (2TO2) supply potential to fire thyratrons FT3 and FT6 respectively, and secondaries 2SO3 and 6SO3 (1TO3) and 3SO3 and 5SO3 (2TO3) supply potential to fire thyratons FT2 and FT5 respectively.

Standby condition—Fig. 2

During the standby condition the Units which cooperate with the Power Supply Unit shown in Fig. 2 are in the same condition as the corresponding Units of the Fig. 1 apparatus. If the ratchet relay RL is set on an unconnected contact, the selective relays are deenergized and their contacts 821 to 867 are in the positions shown Fig. 2.

During one low frequency half-period then, when the selective relays are deenergized, ignitrons I–7 to I–12 are energized in succession, and current flows downward through the primary of the welding transformer. During the succeeding low frequency half-period, the selective relays are energized, and the ignitrons I–1 to I–6 conduct in succession, transmitting current upward through the primary P. During each low-frequency half-period a weld is produced.

It is seen that the operation of the Figs. 1A to 1F apparatus differs from that of the Fig. 2 apparatus in that in the former the thyratrons FT1 to FT6 are fired in the same succession during the half-periods of both polarity while in the latter the thyratrons are fired in the succession FT4 and FT2 together, FT3, FT5, FT1, FT6, FT2 during half-periods of one polarity and in the succession FT1 and FT5 together, FT6, FT2, FT4, FT3, FT5 during the half-period of the other polarity. The apparatus shown in Figs. 1A to 1F operates more satisfactorily than the Fig. 2 apparatus for this reason.

We claim as our invention:

1. In combination, a supply conductor; a first load conductor; a second load conductor; a first electric discharge device having an anode, a cathode and an igniter; a second electric discharge device having an anode, a cathode and an igniter; connections connecting said anodes to said supply conductor; connections connecting the cathode of said first device to said first load conductor; connections connecting the cathode of said second device to said second load conductor; a control circuit common to the igniters of both said devices and including a firing electric discharge device; and means for selectively connecting said control circuit to control one or the other of said igniters, said means including means for connecting said firing device in series with the igniter of the one or the other of said devices which said control circuit controls.

2. In combination, a plurality of supply conductors; a first load conductor; a second load conductor; a first plurality of pairs of discharge devices, each device having an anode, a cathode and a control electrode; connections between the anodes of each pair and a different one of said supply conductors; connections between the cathodes of one device of each pair and said first load conductor; connections between the cathode of the other device of each pair and said second load conductor; a second plurality of pairs of discharge devices, each device having an anode, a cathode and a control electrode; connections between the cathodes of each pair of said second plurality and a different one of said supply conductors; connections between the anode of one device of each pair of said second plurality and said first load conductor; connections between the anode of the other device of each pair of said second plurality and said second load conductor; a control circuit common to each of said pairs of discharge devices; and means for selectively connecting said control circuit to the control electrodes of one or the other of said pairs of devices.

3. In combination, a plurality of supply conductors; a first load conductor; a second load conductor; a first pair of discharge devices, each device having an anode, a cathode and a control electrode, associated with each supply conductor; means connecting the anode of one device of each pair and the cathode of the other device of each pair to the associated supply conductor; a second pair of discharge devices, each last-named device having an anode, a cathode and a control electrode, associated with each supply conductor; means for connecting the anode of one device of each second pair and the cathode of the other device of each second pair to the associated supply conductor; means for connecting the anode of said other device of each first pair to said first load conductor; means for connecting the cathode of said one device of each first pair to said second load conductor; means for connecting the anode of said other device of each said second pair to said second load conductor; means for connecting the cathode of said one device of each second pair to said first conductor; a control circuit common to said one device of each said first pair and said one device of each said second pair; a control circuit common to said other device of each said first pair and to said other device of each said second pair; and means for selectively connecting all said control circuits either to the control electrodes of the devices of said first pairs or the control electrodes of the devices of said second pairs.

4. Apparatus according to claim 3 characterized by a plurality of relays each relay having a first set of contacts and a second set of contacts; by means for connecting the contacts of said first set each between an associated control circuit and the control electrode of an associated discharge device; by means for connecting the contacts of said second set each between said associated control circuit and the control electrode of the other associated discharge device; and by means for selectively maintaining the contacts of one of said sets closed and the contacts of the other of said sets open.

5. Apparatus according to claim 4 characterized by mechanical linkages between the sets of contacts of said relays for actuating said contacts of all said relays together when said relays are actuated to open the contacts of the closed sets and to close the contacts of the open sets.

6. In combination, a plurality of supply conductors; a first load conductor; a second load conductor; a first pair of discharge devices; each device having an anode, a cathode and a control electrode, associated with each supply conductor; means connecting the anode of one device of each pair and the cathode of the other device of each pair to the associated supply conductor; a second pair of discharge devices, each last-named device having an anode, a cathode and a control electrode, associated with each supply conductor; means for connecting the anode of one device of each second pair and the cathode of the other device of each second pair to the associated supply conductor; means for connecting the anode of said other device of each first pair to said first load conductor; means for connecting the cathode of said one device of each first pair to said second load conductor; means for connecting the anode of said other device of each said second pair to said second load conductor; means for connecting the cathode of said one device of each second pair to said first conductor; a control circuit common to said one device of each said first pair and said one device of each said second pair; a control circuit common to said other device of each said first pair and to said other device of each said second pair; means for selectively connecting all said control circuits either to the control electrodes of the devices of said first pairs or the control electrodes of the devices of said second pairs; and means for rendering said control circuit effective to cause them to render the devices to the control electrodes of which they are respectively connected conductive for a predetermined interval of time.

7. In combination, a plurality of supply conductors; a first load conductor; a second load conductor; a first pair of discharge devices; each device having an anode, a cathode and a control electrode, associated with each supply conductor; means connecting the anode of one device of each pair and the cathode of the other device of each pair to the associated supply conductor; a second pair of discharge devices, each last-named device having an anode, a cathode and a control electrode, associated with each supply conductor; means for connecting the anode of one device of each second pair and the cathode of the other device of each second pair to the associated supply conductor; means for connecting the anode of said other device of each first pair to said first load conductor; means for connecting the cathode of said one device of each first pair to said second load conductor; means for connecting the anode of said other device of each said second pair to said second load conductor; means for connecting the cathode of said one device of each second pair to said first conductor; a control circuit common to said one device of each said first pair and said one device of each said second pair; a control circuit common to said other device of each said first pair and to said other device of each said second pair; means for selectively connecting all said control circuits either to the control electrodes of the devices of said first pairs or the control electrodes of the devices of said second pairs; means for rendering said control circuit effective to cause them to render the devices to the control electrodes of which they are respectively connected conductive for a predetermined interval of time; means responsive to the conduction of said conductive discharge devices for conditioning said selectively connecting means to disconnect all said control circuits from the control electrodes to which they are connected and to connect said control circuits to the control electrodes of the associated discharge devices from which they have been disconnected; and means responsive to the discontinuing of the conduction of said conductive discharge devices for actuating said selectively connecting means as conditioned.

8. In combination, a plurality of supply conductors; a first load conductor; a second load conductor; a first pair of discharge devices; each device having an anode, a cathode and a control electrode associated with each supply conductor; means connecting the anode of one device of each pair and the cathode of the other device of each pair to the associated supply conductor; a second pair of discharge devices, each last-named device having an anode, a cathode and a control electrode associated with each supply conductor; means for connecting the anode of one device of each second pair and the cathode of the other device of each second pair to the associated supply conductor; means for connecting the anode of said other device of each first pair to said first load conductor; means for connecting the cathode of said one device of each first pair to said second load conductor; means for connecting the anode of said other device of each said second pair to said second load conductor; means for connecting the cathode of said one device of each second pair to said first conductor; a control circuit common to said one device of each said first pair and said one device of each said second pair; a control circuit common to said other device of each said first pair and to said other device of each said second pair; means for selectively connecting all said control circuits either to the control electrodes of the devices of said first pairs or the control electrodes of the devices of said second pairs; means for rendering said control circuit effective to cause them to render the devices to the control electrodes of which they are respectively connected conductive for a predetermined interval of time; and means for actuating said selectively connecting means to disconnect all said control circuits from the control electrodes to which they are connected and to connect said control circuits to the control electrodes of the associated discharge devices from which they have been disconnected; said actuating means operating after said conductive discharge devices have stopped conducting.

9. Apparatus according to claim 7 characterized by means electrically interlocked with said actuating means, for permitting the further operation of said rendering means after the operation of the actuating means, only if the operation of the actuating means is complete.

10. In combination, a supply conductor; a first load conductor; a second load conductor; a first ignitron having an anode, a cathode and an igniter; a second ignitron having an anode, a cathode and an igniter; connections connecting said anodes to said supply conductor; connections connecting the cathode of said first ignitron to said load conductor; connections connecting the cathode of said second ignitron to said second load conductor; a firing tube having an anode and a cathode; switch means for selectively connecting the anode and cathode of said tube either respectively to said anode and igniter of said first ignitron or said anode and igniter of said second ignitron; means for rendering said firing tube conductive to render the ignitron to which it is connected conductive; means responsive to the conduction of said last-named ignitron for conditioning said switch means to operate to disconnect said anode and cathode of said tube from the anode and igniter respectively to which it is connected and to connect said anode and cathode to the other anode and igniter respectively; and means responsive to the discontinuing of the conduction in said last-named ignitron for causing said switch means to operate as conditioned.

11. In combination, a supply conductor, a first load conductor; a second load conductor; a first electric discharge device having an anode, a cathode and a control electrode; a second electric discharge device having an anode, a cathode and a control electrode; connections connecting said cathodes to said supply conductor; connections connecting the anode of said first device to said first load conductor; connections connecting the anode of said second device to said second load conductor; a control circuit common to the control electrodes of both said devices; and means for selectively connecting said control circuit to control one or the other of said control electrodes.

12. In combination, a supply conductor; a first load conductor; a second load conductor; a first ignitron having an anode, a cathode and an igniter; a second ignitron having an anode, a cathode and an igniter; connections connecting said cathodes to said supply conductor; connections connecting the anodes of said first ignitron to said first load conductor; connections connecting the anodes of said second ignitron to said second load conductor; a firing tube having an anode and a cathode; switch means for selectively connecting the anode and cathode of said tube either respectively to said anode and igniter of said first ignitron or said anode and igniter of said second ignitron; means for rendering said firing tube conductive to render the ignitron to which it is connected conductive; means responsive to the conduction of said last-named ignitron for conditioning said switch means to operate to disconnect said anode and cathode of said tube from the anode and igniter respectively to which it is connected and to connect said anode and cathode to the other anode and igniter respectively; and means responsive to the discontinuing of the conduction in said last-named ignitron for causing said switch means to operate as conditioned.

13. In combination, a supply conductor; a first load conductor; a second load conductor; a first electric discharge device having a first anode, a first cathode and a first control electrode; a second electric discharge device having a second anode, a second cathode and a second control electrode; a third electric discharge device having a third anode, a third cathode and a third control electrode; a fourth electric discharge device having a fourth anode; a fourth cathode and a fourth control electride; connections connecting said first and second anodes to said supply conductor; connections connecting said third and fourth cathodes to said supply conductor; connections connecting said first cathode to said first load conductor; connections connecting said second cathode to said second load conductor; connections connecting said third anode to said second load conductor; connections connecting said fourth anode to said first load conductor; a first control circuit; a second control circuit; a first relay for selectively connecting said first control circuit either to said first control electrode or to said second control electrode; a second relay for selectively connecting said second control circuit either to said third control electrode or to said fourth control electrode; and interlock means between said first and second relays for interlocking said relays so that said first control circuit and said second control circuit are connected to said first and third or to said second and fourth control electrodes simultaneously.

14. Apparatus for controlling the supply of power from an $n$-bus $n$-phase source to a load having first and second terminals comprising a first set of $n$ pairs of ignitrons, each ignitron having an igniter, each pair being connected in antiparallel between a different bus of said supply and said first terminal; and a second set of $n$ pairs of ignitrons, each ignitron having an igniter, and each of said last-named pair being connected in antiparallel between a different bus of said supply and said second terminal; characterized by only $n$ firing tubes for said $n$ pairs of ignitrons and by means for selectively connecting said firing tubes either to the igniters of one group each of ignitrons of both sets so that current of one polarity may be conducted through said load or to the igniters of the other ignitrons of the other group of both said sets so that current of the opposite polarity may be conducted through said load.

15. Apparatus according to claim 14 characterized by means for rendering said $n$ firing tubes conductive in a predetermined succession during a predetermined time interval to render the ignitrons to the igniters of which said firing tubes are connected by said selectively connecting means conductive and by means for actuating said selectively connecting means to connect said firing tubes to the igniters of the other ignitrons immediately after said interval.

16. Apparatus according to claim 15 characterized by interlock means between selectively connecting means and the rendering means permitting the rendering means to render the firing tubes conductive only if said selectively connecting means has operated completely.

17. In combination, a pair of supply conductors; a first load conductor; a second load conductor; a first ignitron having an igniter; a second ignitron having an igniter; connections for connecting said ignitrons in antiparallel from one supply conductor to said first load conductor; means for connecting said second load conductor to said other supply conductor; a firing tube common to both said ignitrons; and means for selectively connecting said firing tube either to the igniter of said first ignitron or to the igniter of said second ignitron.

18. In combination, a plurality of supply conductors; a first load conductor; a second load conductor; a pair of ignitrons each interposed in antiparallel between each of said supply conductors and said first load conductor; a pair of ignitrons each interposed in antiparallel between each of said supply conductors and said second load conductors; each of the ignitrons of said pairs having an igniter; a firing tube associated with each said pair; and means for selectively connecting each said firing tube to the igniter of one ignitron of each pair so that current of one polarity may be conducted between said load conductors or to the igniter of the other ignitron of each pair so that current of the opposite polarity may be conducted between said load conductors.

19. Apparatus according to claim 14 characterized by means for rendering said $n$ firing tubes conductive in a predetermined succession during a predetermined interval to render the ignitrons to the igniters of which said firing tubes are connected by said selectively connecting means conductive; and by means responsive to the current conducted by said ignitrons for actuating said selectively connecting means to connect said firing tubes to the igniters of the other ignitrons immediately after said interval.

20. In combination, a plurality of supply conductors; a first load conductor; a second load conductor, an auxiliary conductor; a first pair of ignitrons and a second pair of ignitrons associated with each supply conductor, each said ignitron having an anode, a cathode and an igniter; connections connecting the cathodes of each said first pair to a corresponding supply conductor; connections connecting the anodes of each said second pair to said corresponding supply conductor; connections connecting the anodes of one of the ignitrons of each said first pair to said first load conductor; connections connecting the anodes of the other of the ignitrons of each said first pair to said second load conductor; connections connecting the cathodes of one of the ignitrons of each said second pair to said second load conductor; connections connecting the cathodes of the other ignitron of each said second pair to said first load conductor; a firing tube associated with each pair of ignitrons, said firing tube having an anode and a cathode; connections connecting the anodes of all the firing tubes associated with said first pairs of ignitrons to said auxiliary conductor; connections connecting the anodes of each of the other firing tubes to a different supply conductor; a first switch between said auxiliary conductor and said first load conductor; a second switch between said auxiliary conductor and said second load conductor; a first set of switches each switch connected between said cathode of a firing tube and the igniter of one of the ignitrons of the associated first and second pairs of ignitrons; a second set of switches each switch connected between said cathode of said firing tube and the igniter of said other ignitron of the associated first and second pair of ignitrons; and selective interlock means between said switches for maintaining either said first switch and said first set of switches simultaneously closed and said second switch and said second set of switches simultaneously open or vice versa.

21. Apparatus according to claim 20 characterized by means for rendering said firing tubes conductive to render the ignitrons at any time connected to said tubes by the interlock means conductive; by means responsive to the conduction through said ignitrons for conditioning said interlock means to operate, and by means responsive to the discontinuing of the conduction through said ignitron to operate said interlock means to a position in which the said firing tubes are connected to said other ignitrons.

22. In combination, a transformer having a single primary with only a pair of terminals; a plurality of supply terminals; a first plurality of discharge devices connected in antiparallel between each said supply terminal and one terminal of said transformer; and a second plurality of discharge devices connected in antiparallel between each said supply terminal and the other terminal of said transformer.

23. In combination; a transformer having a single primary with only a pair of terminals; a plurality of supply terminals; a first plurality of discharge devices connected in antiparallel between each said supply terminal and one terminal of said transformer; a second plurality of discharge devices connected in antiparallel between each said supply terminal and the other terminal of said transformer; and timing means for rendering one each of said antiparallel devices conductive for a predetermined time interval to conduct current of one polarity through said primary, maintaining all said devices non-conductive for a second time interval and thereafter rendering said other devices conductive for a predetermined time interval to conduct current of the opposite polarity through said primary.

24. In combination, a supply conductor; a first load conductor; a second load conductor; a first asymmetrically conductive electric discharge device having a pair of principal electrodes and a control electrode; a second asymetrically conductive electric discharge device also having a pair of principal electrodes and a control electrode; connections connecting a principal electrode of each said device to said supply conductor to conduct current of the same polarity with respect to said supply conductor, connections connecting the other electrode of the first device to said first load conductor; connections connecting the other electrode of the second device to said second load conductor; a control circuit common to the control electrodes of both said devices; and means for selectively connecting said control circuit to control one or the other of said control electrodes.

25. In combination a first electric discharge device having a control electrode; a second electric discharge device having a control electrode, a control circuit common to said control electrodes, switch means for selectively connecting said control circuit to either of said control electrodes, conductor means connected to said control circuit for transmitting a signal to actuate said control circuit, and additional switch means actuable with said first-named switch means and interposed in said conductor means to open and reclose said conductor means on each actuation of said first-named switch means.

26. The combination according to claim 25 characterized by the fact that the first-named switch means includes a normally open and a normally closed contact, the conductor means includes a pair of conductors connected in parallel and the additional switch means includes a normally closed contact interposed in one of said conductors and a normally open contact interposed in the other conductor.

27. Apparatus for supplying power derived from an alternating current source to a load operating at a lower frequency than that of the source including a plurality of pairs of electric discharge devices each having a control electrode interposed between said source and said load, one device of each pair being connected to conduct current of one polarity to the load and the other device of each pair being connected to conduct current of the opposite polarity to the load, said apparatus being characterized by a control circuit common to the control electrodes of each pair of devices and by means of selectively connecting said control circuit to one control electrode or the other.

28. Apparatus according to claim 27 characterized by the fact that each of the devices is an ignitron having an anode, a cathode and an igniter, each control circuit includes a firing thyratron, and the selective connection means includes switch means for selectively connecting each firing thyratron to the igniter of one ignitron of each pair or to the igniter of the other ignitron of each pair.

References Cited in the file of this patent

UNITED STATES PATENTS

| | | |
|---|---|---|
| 2,201,006 | Kilgore | May 14, 1940 |
| 2,272,714 | Lamb | Feb. 10, 1942 |
| 2,372,017 | Rogers | Mar. 20, 1945 |
| 2,397,089 | Cox | Mar. 26, 1946 |
| 2,415,708 | Sciaky | Feb. 11, 1947 |
| 2,447,133 | Nims | Aug. 17, 1948 |
| 2,704,820 | Martin | Mar. 22, 1955 |